US010545901B2

(12) United States Patent
Seiler et al.

(10) Patent No.: US 10,545,901 B2
(45) Date of Patent: Jan. 28, 2020

(54) MEMORY CARD EXPANSION

(71) Applicant: Hewlett-Packard Development Company, L.P., Houston, TX (US)

(72) Inventors: Peter Seiler, Wellington, CO (US); Shane Ward, Windsor, CO (US); Byron A. Alcorn, Fort Collins, CO (US); Raphael Gay, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 78 days.

(21) Appl. No.: 15/543,207

(22) PCT Filed: Jan. 29, 2015

(86) PCT No.: PCT/US2015/013404
§ 371 (c)(1),
(2) Date: Jul. 12, 2017

(87) PCT Pub. No.: WO2016/122505
PCT Pub. Date: Aug. 4, 2016

(65) Prior Publication Data
US 2018/0276167 A1    Sep. 27, 2018

(51) Int. Cl.
*G06F 13/40*    (2006.01)
*G06F 13/16*    (2006.01)

(52) U.S. Cl.
CPC ...... *G06F 13/4068* (2013.01); *G06F 13/1668* (2013.01)

(58) Field of Classification Search
CPC .................. G06F 13/1668; G06F 13/4068
See application file for complete search history.

(56) References Cited

U.S. PATENT DOCUMENTS

| 8,693,208 B2 | 4/2014 | Reinke et al. | |
| 8,830,683 B2 | 9/2014 | Cong et al. | |
| 2010/0241799 A1* | 9/2010 | Schuette | G06F 3/0626 |
| | | | 711/104 |
| 2011/0320690 A1* | 12/2011 | Petersen | G06F 3/0611 |
| | | | 711/103 |
| 2012/0170210 A1* | 7/2012 | Kim | F28D 15/02 |
| | | | 361/679.54 |

(Continued)

FOREIGN PATENT DOCUMENTS

| CN | 103019998 A | 4/2013 |
| TW | M476965 U | 4/2014 |

(Continued)

OTHER PUBLICATIONS

Internal SATA Connections, 2014, pp. 1-2, Sonnet Technologies, Inc.

*Primary Examiner* — Zachary K Huson
(74) *Attorney, Agent, or Firm* — Fabian VanCott (57) ABSTRACT

An apparatus includes a memory card that includes at least one memory module and an expansion connector to connect with at least one expansion memory card. A lane distributor on the memory card interfaces with a set of bidirectional lanes and provides a base lane set and an expanded lane set of bidirectional lanes to support communications with the memory module and the expansion memory card via the expansion connector.

20 Claims, 6 Drawing Sheets

(56) References Cited

U.S. PATENT DOCUMENTS

| | | |
|---|---|---|
| 2013/0232298 A1 | 9/2013 | Schuette |
| 2014/0129753 A1 | 5/2014 | Schuette et al. |
| 2014/0304456 A1 | 10/2014 | Narasimha et al. |
| 2014/0365700 A1 | 12/2014 | Cai et al. |
| 2015/0067229 A1* | 3/2015 | Connor ............... G06F 13/4022 710/317 |

FOREIGN PATENT DOCUMENTS

| | | |
|---|---|---|
| TW | M491215 U | 12/2014 |
| WO | 2010-087860 A1 | 8/2010 |

* cited by examiner

MEMORY CARD EXPANSION

BACKGROUND

Expansion personal computer (PC) buses operate in consumer, server, and industrial applications. These buses provide a PC motherboard-level interconnect (e.g., to link motherboard-mounted peripherals) that includes a passive backplane interconnect and an expansion card interface for add-in boards. In virtually all modern personal computers, from consumer laptops and desktops to enterprise data servers, the expansion bus serves as the primary motherboard-level interconnect, connecting the host system-processor with both integrated-peripherals (surface-mounted ICs) and add-on peripherals (expansion cards). In many of these systems, the expansion bus co-exists with one or more legacy buses, for backward compatibility with a large body of legacy peripherals.

DETAILED DESCRIPTION

This disclosure relates to a memory card that provides expanded memory capabilities while conserving resources of a computer expansion bus. A memory card is provided that includes at least one memory module which can be configured as one or more solid state memory devices (SSD). One example configuration for the memory card includes having four memory modules provided as a base set of memory for a computer. The memory card includes an expansion connector to connect with at least one expansion memory card (e.g., four expansion modules) which can also be configured as an SSD. A lane distributor on the memory card interfaces with a set of bidirectional lanes to distribute the lanes for communications with the memory and expansion memory cards. The bidirectional lanes include serial input and output capabilities to interface with the respective memory module and expanded memory module of the memory card. The lane distributor provides a base lane set and an expanded lane set of bidirectional lanes to support communications with the memory module and the expansion memory card via the expansion connector. The expanded memory module can be added to the memory card in a daughter-card configuration where the memory card and the daughter card occupy space for a single motherboard connector thus freeing other motherboard connectors for other resources than memory.

Figure 1:
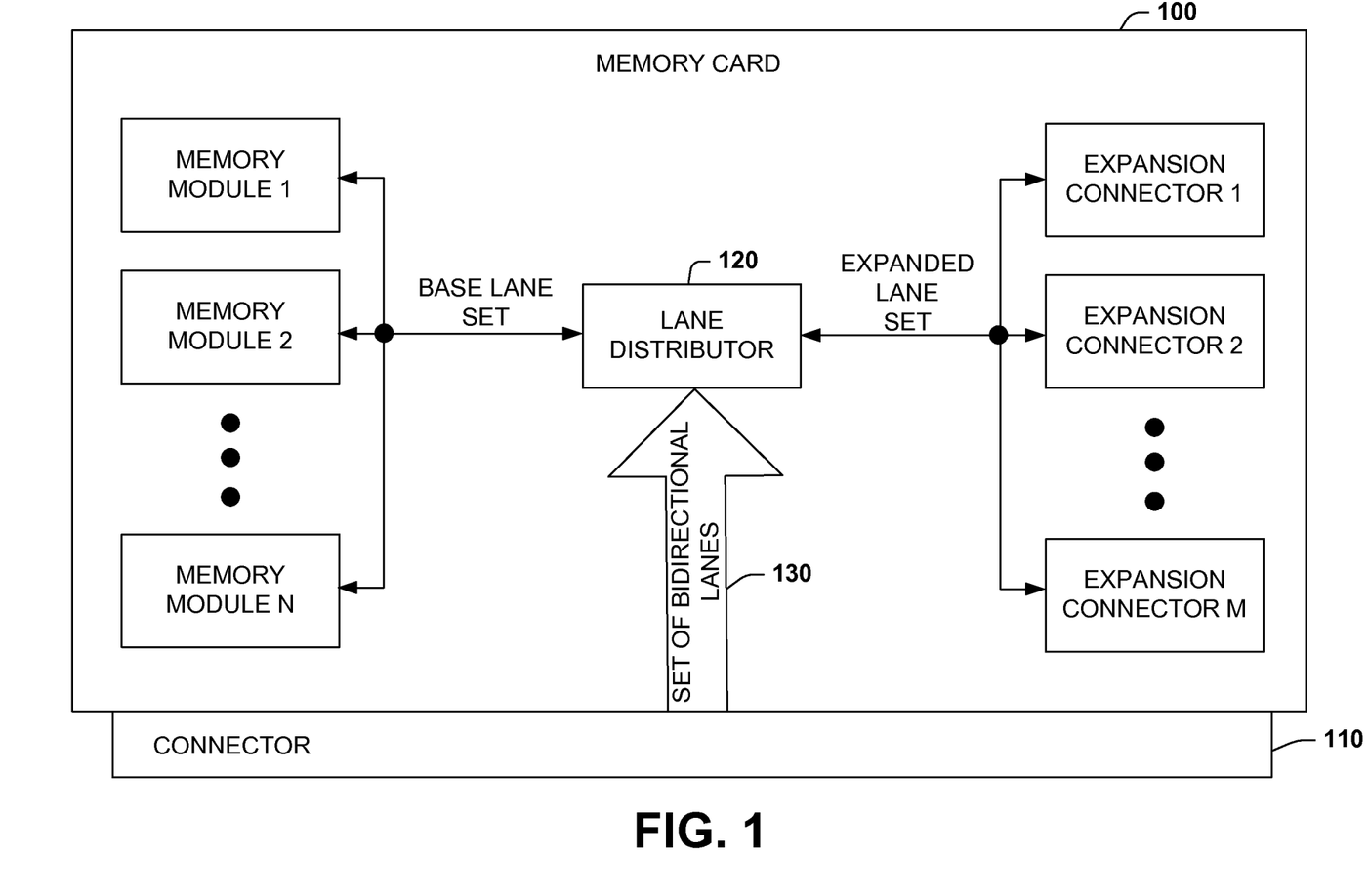
FIG. 1 illustrates an example of an apparatus that includes a memory card having expansion memory capabilities.

FIG. 1 illustrates an example of an apparatus that includes a memory card 100 having expansion memory capabilities.

The memory card one includes at least one memory module shown as memory modules 1 through N, with N being a positive integer. Each memory module 1-N can be configured as a solid state memory device (SSD), for example, that can be employed as a solid state storage medium that can interface to a computer mother board via a connector 110. One example configuration for the memory card 100 includes having four memory modules provided as a base set of memory for a computer; however, more or less than four memory modules can be utilized. The memory card 100 includes an expansion connector shown as expansion connectors 1 through M, with M being a positive integer. Each expansion connector 1-M can connect with at least one expansion memory card (See e.g., FIGS. 2 and 6) which can also be configured as an SSD.

A lane distributor 120 on the memory card 100 interfaces with a set of bidirectional lanes 130 which are routed from the connector 110. The bidirectional lanes 130 include serial input and output data transmission capabilities to interface with the respective memory module and expanded memory module of the memory card 100. A bidirectional lane includes two differential signaling pairs, with one pair for receiving data and the other for transmitting data. Thus, each lane includes four electrical wires or signal traces. Conceptually, each lane is used as a full-duplex byte stream, transporting data packets in eight-bit "byte" format concurrently in both directions between endpoints of a link.

The lane distributor 120 provides a base lane set and an expanded lane set of bidirectional lanes to support communications with the memory module and the expansion memory card via the expansion connector. The expanded memory module can be added to the memory card 100 in a daughter-card configuration where the memory card (also referred to as base memory card) and the daughter card can occupy space for a single motherboard connector thus conserving other motherboard connectors for other resources.

The memory module and expanded memory module can be implemented via an M.2 connector and printed circuit board, for example, where M.2, formerly known as the Next Generation Form Factor (NGFF), is a specification for internally mounted computer expansion cards. In one example, the connector 100 and bidirectional lanes 130 can be associated with a Peripheral Component Interconnect Express (PCIe) bus; although, substantially any type of computer bus supporting serial communications can be employed. The lane distributor 120 can be a PCIe switch (e.g., x16 to x32 switch), for example, however substantially any type of signal router or signal multiplexer can be employed. As used herein, the term x8, or x16, or x32 refers to a number of bidirectional communications lanes supported on a given internal and/or external bus. Physical PCI Express slots may contain from one to 32 lanes, more precisely 1, 2, 4, 8, 12, 16 or 32 lanes, for example. Lane counts are written with an "x" prefix (for example, "x8" represents an eight-lane card or slot), with x16 being the largest size in common use.

With respect to a PCIe bus example, to support increasing adoption of PCIe-attached memory storage, while maximizing space and performance, current base memory cards can be modified to facilitate additional M.2 drives through a daughter card (also referred to as expansion memory card in FIG. 2), yet taking up but one x16 PCIe card slot on the respective computer mother board. Such a daughter card can be utilized to address user memory requirements of having between 5 to 8 M.2 SSDs without taking up additional PCIe slots. This can be enabled through routing PCIe lanes through a PCIe switch as the lane distributor 120 on the base four-module M.2 card, and routing additional lanes to high-speed connectors, which would then interface to a daughter card containing more M.2 connectors for additional SSDs.

The daughter card can interface to a base memory card 100 to support additional PCIe lanes routed to the expansion connectors via the lane distributor 120. These lanes can first route through a x16 PCIe connector 110 on the motherboard, and then be routed through a PCIe switch as the lane distributor 120, for example. Depending on the loading of the SSDs, the switch could be programmed to allocate the PCIe bandwidth to reach the desired amount of performance for given device loads. For example, in some cases each memory module and expansion memory card could be allocated equal amounts of serial signal bandwidth provided from the connector 110. In another example, other allocations are possible where some memory modules or devices receive more or less bandwidth. As will be illustrated and described below with respect to FIG. 3, a root port on the computer mother board can be provided to interface with the lane distributor and memory modules via the connector 110.

Figure 2:
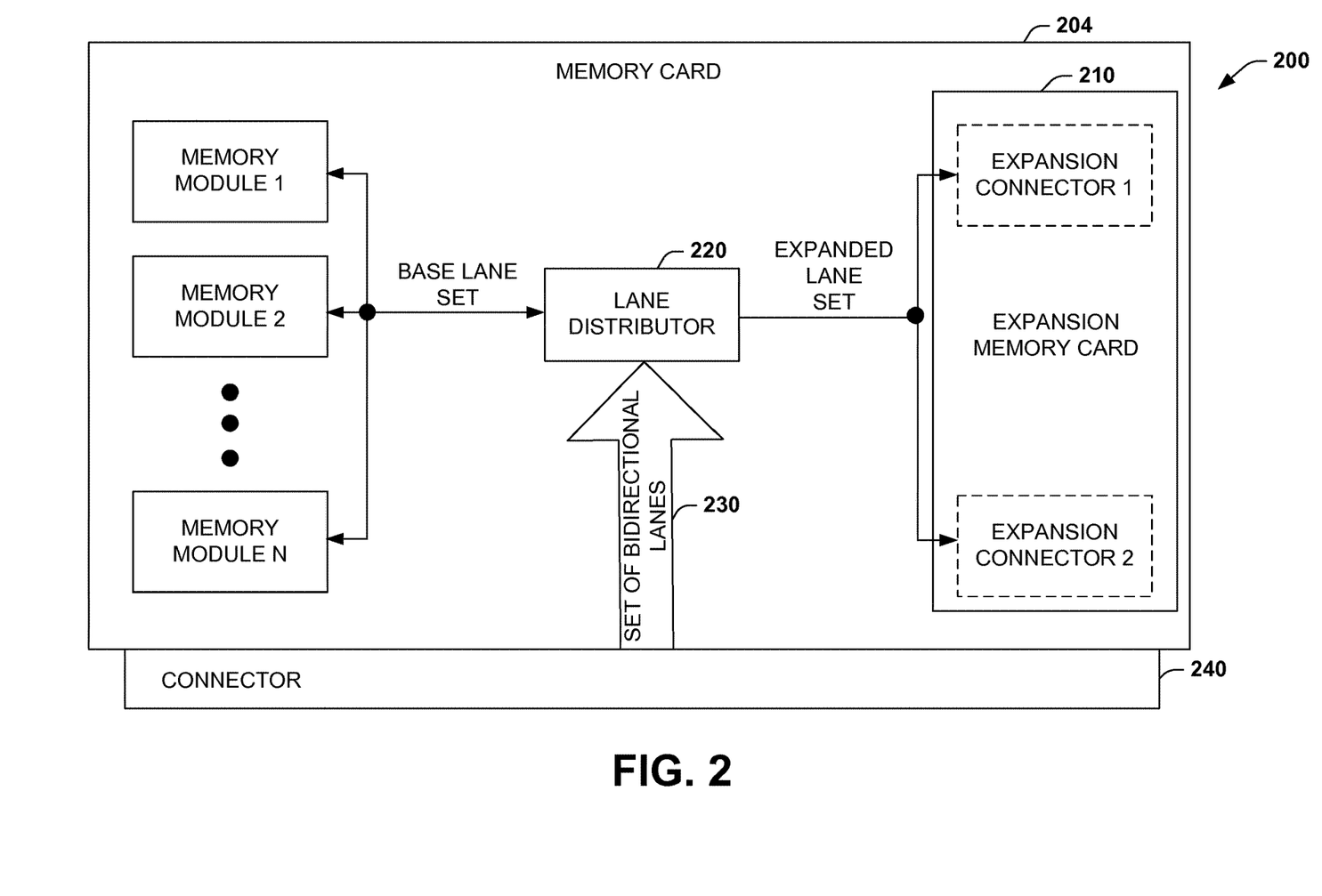
FIG. 2 illustrates an example of a system that includes a memory card and expansion memory card to provide expanded memory capabilities.

FIG. 2 illustrates an example of a system 200 that includes a memory card 204 and expansion memory card 210 to provide expanded memory capabilities. The memory card 204 includes at least one memory module 1 though N. In this example, two expansion connectors 1 and 2 (e.g., x8 connectors) are employed to connect to at least one expansion memory card 210, where the expansion memory card can include one or more solid state memory devices (SSDs). As noted previously, the expansion memory card 210 can be connected as a daughter card to the memory card 204. A lane distributor 220 on the memory card 204 interfaces with a set of bidirectional lanes 230 from connector 240 and provides a base lane set and an expanded lane set of bidirectional lanes to support communications with the memory modules 1-N and the expansion memory card 210. The base lane set supports communications with the memory modules 1-N in all configurations whereas the expanded lane set is utilized if the expanded memory module 210 is installed.

The connector 240 supports PCIe training (e.g., configuration action that occurs at power-on via root port), which is a PCIe function/activity to determine how the bidirectional lanes 230 are deployed. Lanes can be grouped in sets of 1, 2, 8, 12, 16, or 32 with each set defining a link. Each link that trains is dependent on the endpoint device that include memory modules or switches in these examples. The speed of the link and the width of the link can be determined during the training cycle. The PCIe switch or lane distributor 220 and the PCIe M.2 devices of the respective memory modules can be discovered through the PCIe configuration space and can be enumerated in a PCIe tree hierarchy. When enumerated, each PCIe device can be addressed and packets can be sent. During operation, the PCIe hierarchy and any intermediate device, such as a switch, will know (though training) how to route packets destined for a particular endpoint.

A system management bus (SMB) can be used to discover specific information about the PCIe card or daughter card. Another type of interface for discovering information includes general purpose input/outputs (GPIOs). The SMB or GPIO can be employed to discover that the daughter card is installed, or a device could query through PCIe configuration space to determine the daughter card is installed based on which lanes of the PCIe switch are active. One application for wanting to detect a daughter card and for which sockets have M.2 modules in them is for diagnostic testing.

An application may determine if a module is installed and if it did not get enumerated in the PCIe tree hierarchy, for example.

Figure 3:
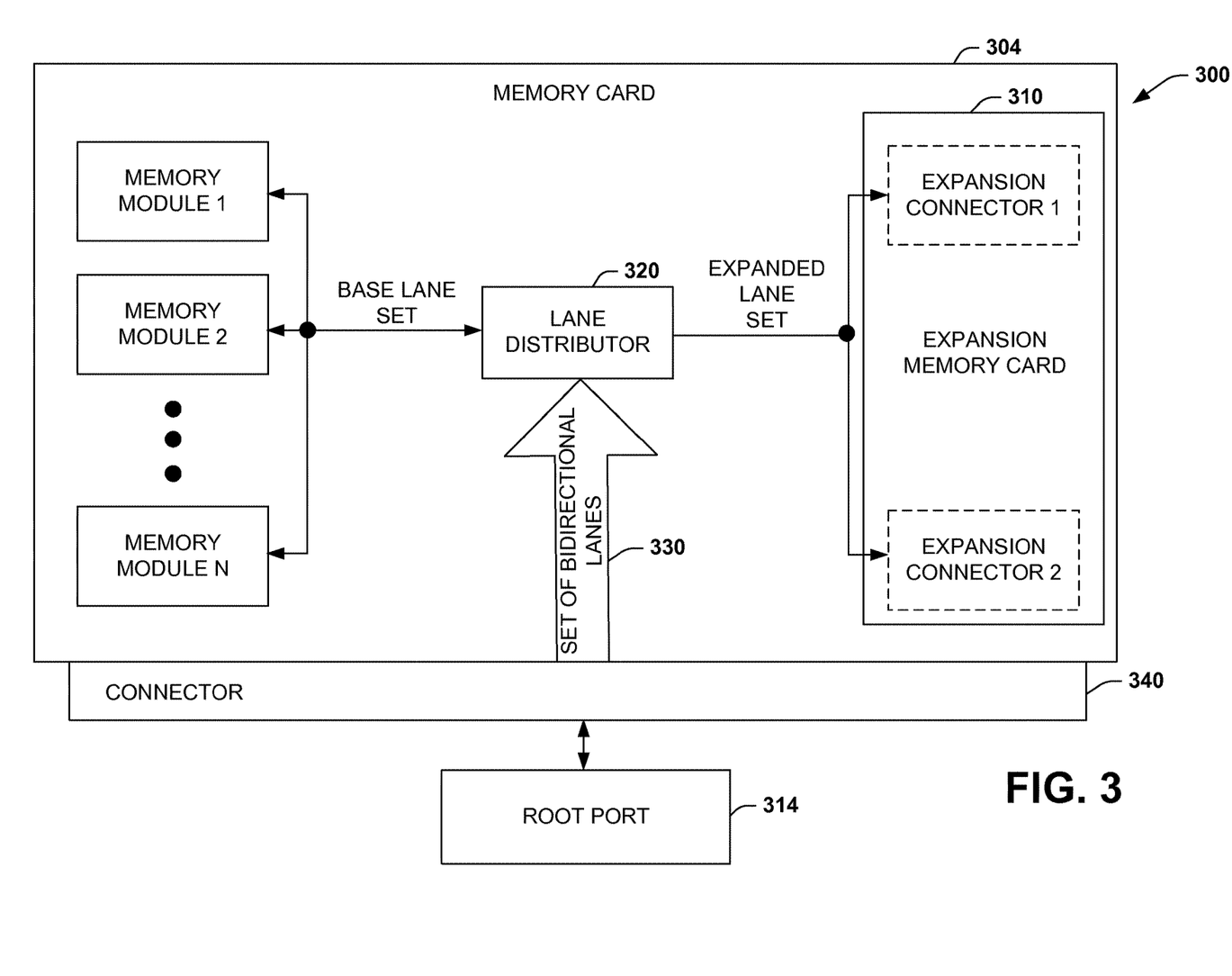
FIG. 3 illustrates an example of a system that includes a memory card and expansion memory card that interfaces with a root port to provide expanded memory capabilities.

FIG. 3 illustrates an example of a system 300 that includes a memory card 304 and expansion memory card 310 that interfaces with a root port 314 to provide expanded memory capabilities. Similar to above, the memory card includes at least one memory module. The expansion memory card 310 is connected via expansion connectors 1 and 2 to the memory card 304. A lane distributor 320 on the memory card interfaces with a set of bidirectional lanes 330 via connector 340 and provides a base lane set and an expanded lane set of bidirectional lanes to support communications with the memory modules 1-N and the expansion memory card 310.

The root port 314 provides an interface to a computer via the set of bidirectional lanes 330, where a host computer can bifurcate the root port into various link widths. The root port 314 will attempt to train (negotiate) a communication path at that maximum bifurcated width. If unable to train at that maximum bifurcated width, it will attempt to train at a reduced width. In some examples, 16 communications lanes are communicated from the root port 314 to the lane distributor 320. If the memory card 304 is plugged into a slot with less than the maximum lanes electrically routed, for example, then the memory card chipset on the host computer may be able to determine a different allocation of lanes to the respective memory modules. Likewise, if there are lanes that are not fully functional on boot, then the memory card chipset on the host computer may bifurcate the lanes to a reduced set of operational lanes (e.g., x1, x2, x4, or x8), if the complete set of lanes do not successfully complete the power-on handshake.

Figure 4:
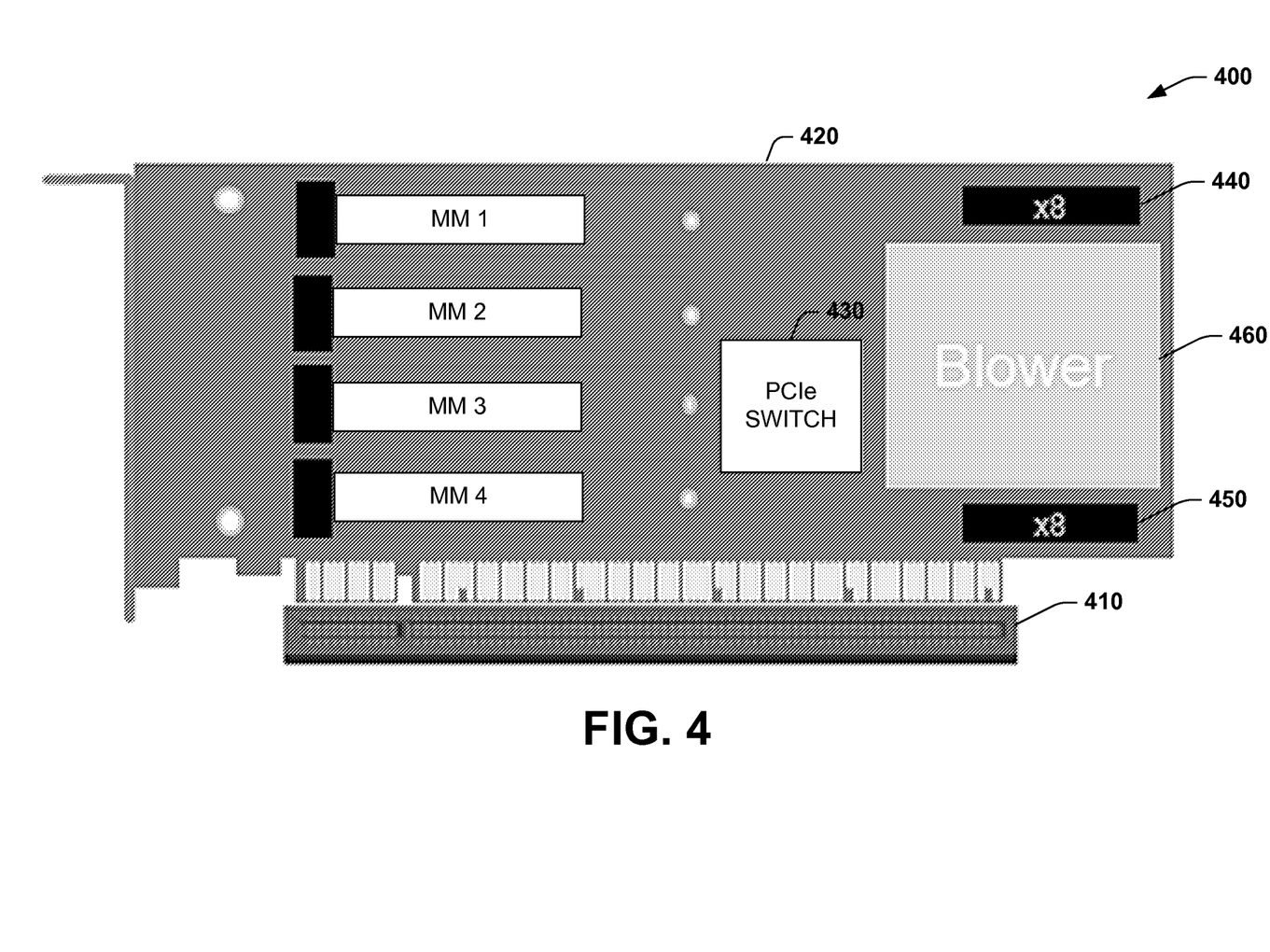
FIG. 4 illustrates an example of a system that includes a connector and a memory card having expansion memory capabilities.

FIG. 4 illustrates an example of a system 400 that includes a connector and a memory card 420 having expansion memory capabilities. As shown, the memory card 420 includes four memory modules shown as MM1 through MM4. A PCIe switch 430 is employed as a lane distributor where two x8 connectors 440 and 450 provide expansion memory capabilities to the memory card. The two x8 connectors can each route 8 bidirectional expansion lanes from the PCIe switch 430. The system 400 can include a blower 460 arranged to provide cooling (e.g., air flow from blades of a fan) to the respective memory modules, expanded memory modules, and lane distributor among other components. The connector 410 represents an example PCIe motherboard connector that can be utilized as an expansion slot for personal computer peripherals.

Figure 5:
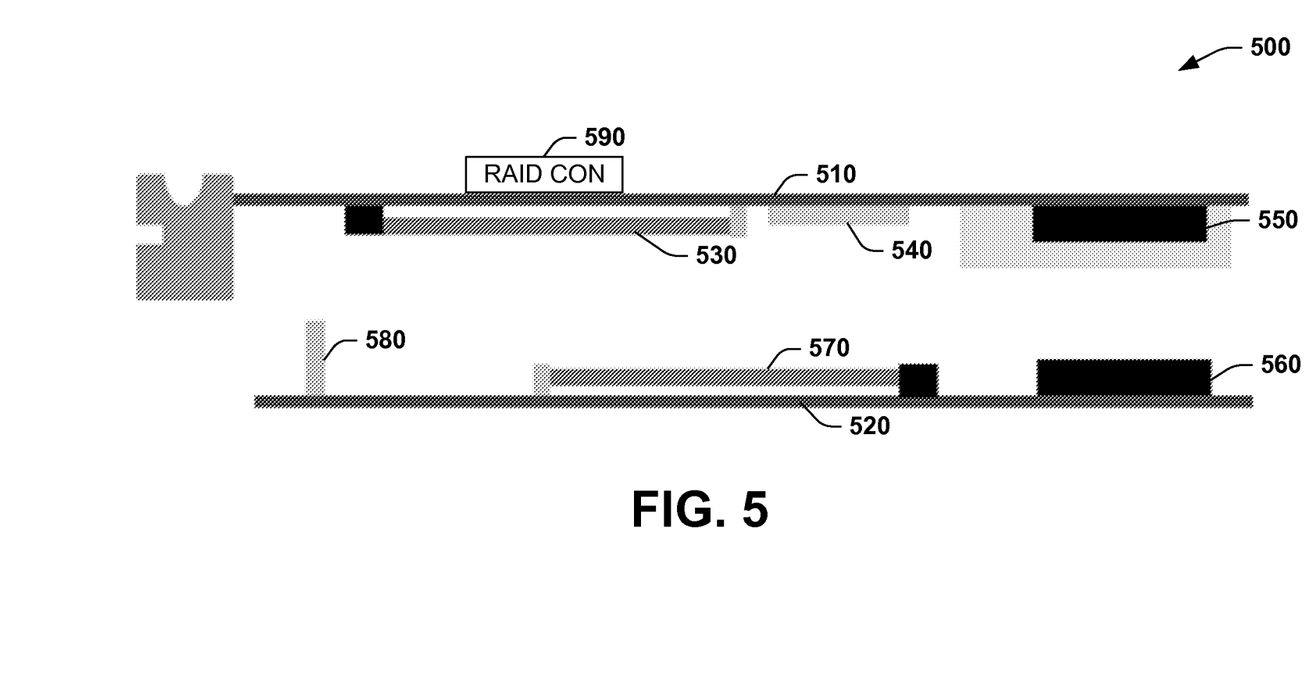
FIG. 5 illustrates a side view of an example of a system that includes a memory card and expansion memory card to provide expanded memory capabilities.

FIG. 5 illustrates a side view of an example of a system 500 that includes a memory card 510 and expansion memory card 520 (also referred to as daughter card) to provide expanded memory capabilities. In this example, the memory card 510 includes at least one memory module 530 and a lane distributor 540 to interface with at least one expansion connector 550. The expansion connector 550 interfaces with a mating connector 560 of the expansion memory card 520 with includes at least one expansion memory device 570 (e.g., SSD).

As shown, the memory card 520 and the daughter card 520 may be assembled parallel to each other, which allows for an active cooler (See e.g., FIG. 4) to cool the amount of heat produced from the PCIe switch and SSDs. The PCIe signals and other general purpose signals can run through high-speed connectors in a manner that air flow can travel through the inside of the chassis and out the rear bulkhead. Sufficient support for the daughter card 520 can be provided through supporting standoffs 580 to reduce risk of damage from dynamic forces on the cards and M.2 memory modules, for example.

The daughter card 520 can augment other PCIe storage options so that one PCIe slot can have between 1 to 8 SSDs which can support memory array configurations such as a redundant array of inexpensive disks (RAID) (e.g., to provide backup or redundant memory capabilities for the memory card). Additional RAID options can be enabled through the memory card 510, where the memory card could potentially be designed to include a hardware-based RAID controller 590. Users could use the card as an option so as not to use a larger chassis than needed, and may help reduce system cost. The memory card 510 and daughter card 520 can also be configured to allow for greater expandability in SSD module lengths and form factors, for example.

Figure 6:
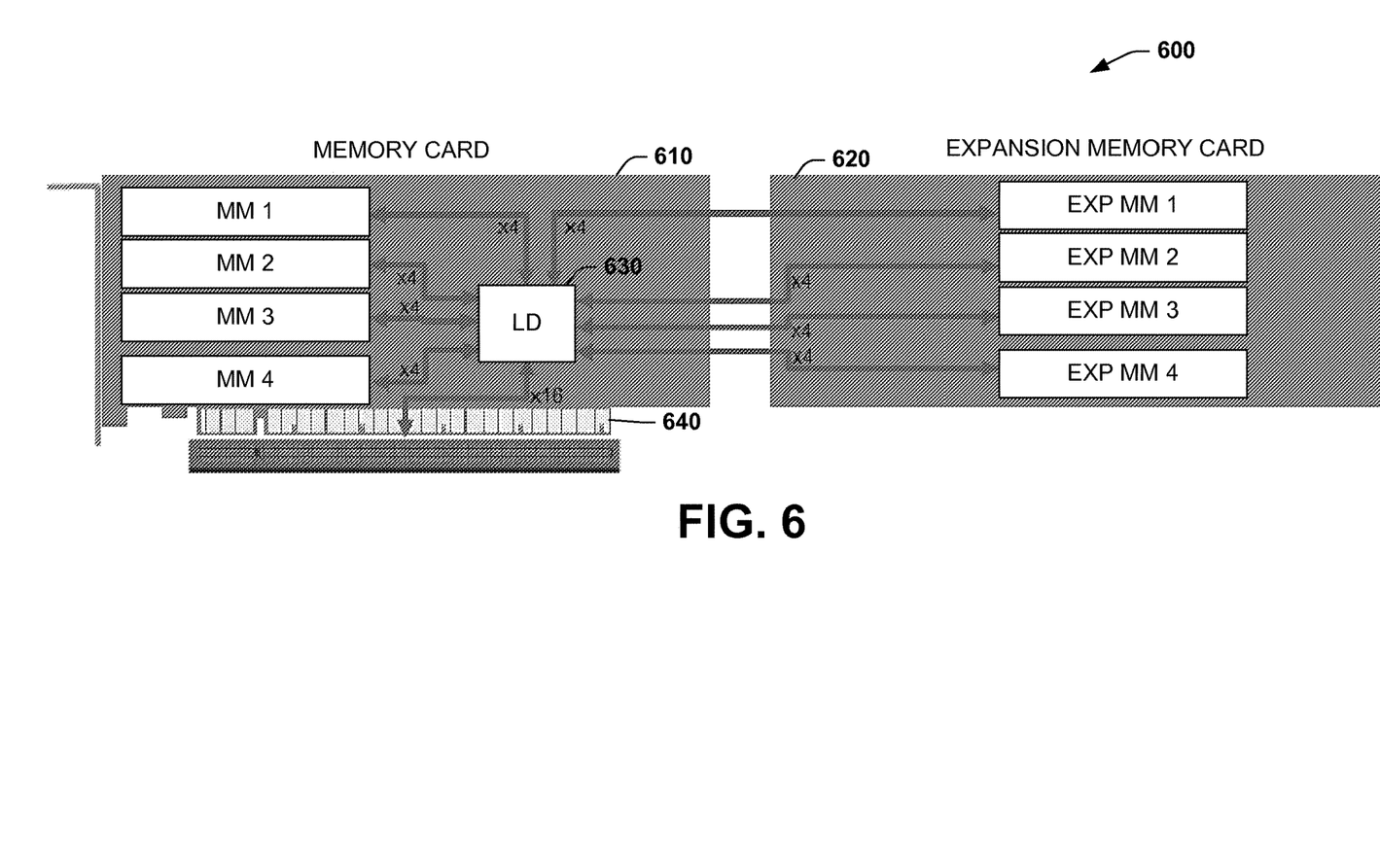
FIG. 6 illustrates an example lane distribution and routing diagram for a memory card and expansion memory card.

FIG. 6 illustrates an example lane distribution and routing diagram 600 for a memory card 610 and expansion memory card 620. In this example, a set of x16 lanes is shown routed to a lane distributor (LD) 630 via connector 640. The lane distributor 640 routes the x16 lanes from connector 640 to a base set of x4 lanes (each x4 is a link) to a set of four base memory modules, shown as MM1 through MM4. The lane distributor 630 also provides the x16 lanes from connector 640 as an expanded set of x4 lanes to the daughter card 620 having four expanded memory modules, shown as EXP MM1 though EXP MM4.

In addition to providing expanded memory capabilities, automatic memory card configuration and detection can also be provided supporting various memory and expanded memory configurations. For example, assuming that four x4 memory devices are supported without a daughter card and eight x2 memory devices are supported with a daughter card. By way of further example, if the system is currently running with four x4 M.2 devices, then following automatic configuration can occur to add four more x4 devices: 1) Power down the system and main card. 2) Remove the main card from the system. 3) Add daughter card to the main card and place it back in the system. 4) Power the system back up.

During power up and startup the following can occur: Multiplexors or other routing techniques can be employed based on having the daughter card installed to take two lanes from each M.2 slot on the main board and route it to the daughter board. A sense pin can be provided to determine that the daughter card was installed and could be used to operate the multiplexer. In this example, the multiplexor would be configured to eight x2 ports. This could be performed with a number of techniques depending on the capabilities of the switch. Each of the 8 ports would train, where each device is enumerated and the PCIe tree hierarchy is created as noted previously.

What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. An apparatus, comprising:
   a first memory card that includes:
      a memory module connector to connect with a first memory module;
      an expansion connector to connect with an expansion memory card;
      a PCIe interface to connect to a host; and
      a lane distributor on the first memory card to interface with a set of bidirectional lanes, the lane distributor comprising a PCIe switch to operate a base lane set and an expanded lane set of bidirectional lanes to support communications with the memory module via the memory module connector and the expansion memory card via the expansion connector; and
   a second memory card that includes:
      a memory module connector to connect a second memory module;
      an expansion connector to connect via the expansion connector of the first memory card; and
      a controller to coordinate operation of the memory module based on signals received on the expanded lane set of the bidirectional lanes,
   wherein the memory module of the second memory card is connectable to the host via the PCIe interface of the first memory card.

2. The apparatus of claim 1, wherein the bidirectional lanes include serial input and output capabilities to access a Peripheral Component Interconnect Express (PCIe) bus.

3. The apparatus of claim 1, further comprising an expansion memory card connected to a second expansion connector of the first memory card to increase memory capacity of the first memory card.

4. The apparatus of claim 3, wherein the memory module of the first memory card and the expansion memory card include a solid state memory device for memory storage.

5. The apparatus of claim 4, wherein the first memory card includes a redundant array of independent disks (RAID) controller to manage redundant memory storage for the memory module of the first memory card and the expansion memory card.

6. The apparatus of claim 1, wherein the first memory card includes a fan arranged between the memory module and an expansion memory card in the expansion connector of the first memory card to provide cooling to the memory module and the expansion memory card.

7. An system, comprising:
   a memory card that includes M.2 memory module integrated into the memory card;
   an M.2 expansion memory card connected via an expansion connector to the memory card;
   a sense pin to signal that the expansion memory card is connected to the expansion connector; and
   a lane distributor on the memory card to interface with a set of bidirectional lanes and to provide a base lane set dedicated to the integrated M.2 memory module and an expanded lane set of bidirectional lanes to support communications with the expansion memory card, the lane distributor to receive input from the sense pin and dynamically deploy the bidirectional lanes based on a number of expansion memory cards connected to the memory card.

8. The system of claim 7, wherein the bidirectional lanes are serial input and output communications connections to interface with a Peripheral Component Interconnect Express (PCIe) bus.

9. The system of claim 7, wherein the lane distributor comprises a PCIe switch to interface with the set of bidirectional lanes.

10. The system of claim 7, further comprising a system management bus to provide an input port to detect the connection of the expansion memory card with the memory card.

11. The system of claim 7, further comprising a root port to interface with the lane distributor and the memory module via the expansion connector and to negotiate a number of lanes in the set of bidirectional lanes with the memory card.

12. The system of claim 7, wherein the memory card includes a redundant array of independent disks (RAID) controller to manage redundant memory storage for the memory card and the expansion memory card, the redundant memory storage for the memory card including the solid state memory device and the memory module of the memory card expansion memory card.

13. A system, comprising:
a memory card that includes a memory module;
an expansion memory card connected via an expansion connector to the memory card;
a lane distributor on the memory card to interface with a set of bidirectional lanes to provide a base lane set and an expanded lane set of bidirectional lanes, wherein the base lane set supports communications with the memory module and the expanded lane set supports communication with the expansion memory card when the expanded memory module is installed; and
a root port to provide an interface to a computer via the set of bidirectional lanes;
wherein the lane distributor is to, upon power up, dynamically assign the bidirectional lanes in a PCIe tree hierarchy, in cooperation with the root port, based on a number of expansion memory cards connectable to the memory card via the expansion connector.

14. The system of claim 13, wherein the memory card includes a redundant array of independent disks (RAID) controller to manage redundant memory storage for the memory card and the expansion memory card, the redundant memory storage for the memory card including the solid state memory device and the memory module of the memory card expansion memory card.

15. The apparatus of claim 1, wherein the memory module of the first memory card is integrated into the first memory card, with the base lane set being dedicated to the integrated memory module.

16. The apparatus of claim 1, further comprising:
four M.2 expansion memory cards connected to the expansion connector of the first memory card,
wherein the memory module of the first memory card comprises four M.2 memory modules integrated into the first memory card; and
wherein each of the memory module of the first memory card and the four M.2 expansion memory cards comprise a solid state drive (SSD) such that eight SSDs are connected to the single PCIe interface of the first memory card.

17. The apparatus of claim 1, wherein the base lane set is dedicated to the memory module of the first memory card and the expanded lane set is dynamically deployed to support an expansion memory card when connected to the expansion connector.

18. The apparatus of claim 6, further comprising a support on the first memory card to support the second memory card at a point away from the expansion connector of the first memory card.

19. The system of claim 7, comprising four integrated M.2 memory modules and four M.2 expansion memory cards, each comprising a solid state drive (SSD) such that eight SSDs are connected to a single PCIe interface of the memory card.

20. The system of claim 7, wherein the expansion memory card is configured as a daughter card to the memory card.

* * * * *